(12) United States Patent
Buras

(10) Patent No.: US 7,338,991 B2
(45) Date of Patent: Mar. 4, 2008

(54) PROCESS FOR PREPARING BITUMEN/RUBBER COMPOSITIONS

(75) Inventor: Paul Buras, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/584,868

(22) Filed: Oct. 23, 2006

(65) Prior Publication Data

US 2007/0072962 A1  Mar. 29, 2007

Related U.S. Application Data

(63) Continuation of application No. 10/357,977, filed on Feb. 4, 2003, now abandoned.

(51) Int. Cl.
*C08L 95/00* (2006.01)
(52) U.S. Cl. .......................................... 524/68; 524/71

(58) Field of Classification Search ............. 524/68–71
See application file for complete search history.

(56) References Cited

U.S. PATENT DOCUMENTS

| 5,382,612 | A  | * | 1/1995 | Chaverot et al. | 524/60 |
| 6,025,418 | A  | * | 2/2000 | Defoor et al.   | 524/71 |
| 6,180,697 | B1 | * | 1/2001 | Kelly et al.    | 524/59 |
| 6,429,241 | B1 | * | 8/2002 | Liang           | 524/68 |
| 6,713,540 | B2 | * | 3/2004 | Rached et al.   | 524/68 |

* cited by examiner

*Primary Examiner*—Peter Szekely
(74) *Attorney, Agent, or Firm*—Shirley A. Kopecky

(57) ABSTRACT

In methods of preparing asphalt and elastomeric polymer compositions, it has been discovered that for a given crosslinker or vulcanizing agent there is an optimum crosslinking temperature to give a composition that has top and bottom softening points that are close. That is, rubber/asphalt compatibility is improved, where the crosslinking is performed within the optimum temperature range.

11 Claims, 3 Drawing Sheets

Compatibility vs. Temperature

Brookfield Viscosity vs. Crosslinking Temperature

PROCESS FOR PREPARING BITUMEN/RUBBER COMPOSITIONS

RELATED APPLICATIONS

This is a continuation application of U.S. patent application Ser. No. 10/357,977, now abandoned, which was filed on Feb. 4, 2003. This continuation application was filed while the Ser. No. 10/357,977 Application was still pending, and this application claims priority to the foregoing parent application.

FIELD OF THE INVENTION

The present invention is related to hydrocarbon-based binders, such as bitumens, asphalts and tars, modified with elastomers, and including a vulcanized stage, which are particularly useful as industrial coatings and road bitumens, or the like. It relates more particularly to processes for obtaining vulcanized compositions based on bitumens and on styrene/butadiene copolymers that have close top and bottom softening points.

BACKGROUND OF THE INVENTION

The use of bitumen (asphalt) compositions in preparing aggregate compositions (including, but not just limited to, bitumen and rock) useful as road paving material is complicated by at least three factors, each of which imposes a serious challenge to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications require a bitumen (asphalt) product to meet defined parameters relating to properties such as viscosity, stiffness, penetration, toughness, tenacity and ductility. Each of these parameters define a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including, but not necessarily limited to, permanent deformation, thermally induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of crosslinking agents (vulcanizing agents) such as sulfur, frequently in the form of elemental sulfur. It is believed that the sulfur chemically couples the polymer and the bitumen through sulfide and/or polysulfide bonds. The addition of extraneous sulfur is required to produce the improved stability, even though bitumens naturally contain varying amounts of native sulfur.

Thus, there is known a process for preparing a bitumen-polymer composition consisting of mixing a bitumen, at 266-446° F. (130-230° C.), with 2 to 20% by weight of a block or random copolymer, having an average molecular weight between 30,000 and 300,000. The resulting mixture is stirred for at least two hours, and then 0.1 to 3% by weight of sulfur relative to the bitumen is added and the mixture agitated for at least 20 minutes. The quantity of added sulfur cited in this patent is 0.1 to 1.5% by weight with respect to the bitumen. The resulting bitumen-polymer composition is used for road-coating, industrial coating, or other industrial applications.

Similarly, there is also known an asphalt (bitumen) polymer composition obtained by hot-blending asphalt with 0.1 to 1.5% by weight of elemental sulfur and 2 to 7% by weight of a natural or synthetic rubber, which can be a linear butadiene/styrene copolymer. A process is additionally known for preparing a rubber-modified bitumen by blending rubber, either natural or synthetic, such as styrene/butadiene rubber, with bitumen at 293-365° F. (145-185° C.), in an amount up to 10% by weight based on the bitumen, then adjusting the temperature to 257-320° F. (125-160° C.), and intimately blending into the mix an amount of sulfur such that the weight ratio of sulfur to rubber is between 0.01 and 0.9. A catalytic quantity of a vulcanization-accelerator is then added to effect vulcanization. A critical nature of the sulfur to rubber ratio is sometimes reported, for instance that weight ratios of sulfur to rubber of less than 0.01 gives modified bitumen of inferior quality.

The second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

As noted, various polymers have been added to asphalts to improve physical and mechanical performance properties. Polymer-modified asphalts (PMAs) are routinely used in the road construction/maintenance and roofing industries. Conventional asphalts often do not retain sufficient elasticity in use and, also, exhibit a plasticity range that is too narrow for use in many modern applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have raised softening point, increased viscoelasticity, enhanced force under strain, enhanced strain recovery, and improved low temperature strain characteristics as compared with non-modified asphalts and asphalt emulsions.

The bituminous binders, even of the bitumen/polymer type, which are presently employed in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes cross-linking of the polymer molecules until the desired asphalt properties are met. This reactant typically is sulfur in a form suitable for reacting.

However, the cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

It is common in the preparation of polymer-modified asphalts to include activators and accelerators to make the crosslinking reaction proceed faster. Zinc oxide (ZnO) is a conventional activator, and mercaptobenzothiazole (MBT) is a conventional accelerator. ZnO is also sometimes used to control the tendency of the polymer to gel. The zinc salt of mercaptobenzothiazole (ZMBT) combines features of both of these conventional additives.

In view of the above, bitumen compositions, which simultaneously meet the performance criteria required for road paving, and which use an alternative activator to the relatively costly ZnO would be advantageous. Additionally, having available a variety of different activators for bitumen compositions would provide versatility. In preparing the composition, significant mixing is needed to insure the uniform addition of both the polymer and any crosslinking agents, accelerators or activators. The crosslinking agents and other agents are usually added as a dry powder and mixed with the asphalt compositions.

One of the methods commonly utilized in the industry to standardize the measure or degree of compatibility of the rubber with the asphalt is referred to as the compatibility test. The test comprises the mixing of the rubber and asphalt with all the applicable additives, such as the crosslinking agents. The mixture is placed in tubes, usually made of aluminum or similar material, referred to as cigar tubes or toothpaste tubes. These tubes are about one inch in diameter and about fifteen centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut into thirds; three equal sections. The ring-and-ball softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, most states require a difference of 4° F. (2° C.) or less to consider the asphalt/rubber composition as compatible. Few standards allow a higher difference. The twenty-four hour test is used as a common comparison point.

As can be seen from the above, methods are known to improve the mixing of asphalt and polymer compositions. The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned governmental physical properties and environmental concerns. Thus, it is a goal of the industry to maintain or reduce the cost of the polymers and crosslinking agents added to the asphalt without sacrificing any of the other elements and improving the properties of the asphalt and polymer compositions as much as possible.

SUMMARY OF THE INVENTION

There is provided, in one form, a method for preparing asphalt and polymer compositions involving first heating a mixture of asphalt and an elastomeric polymer to within an optimum crosslinking temperature range, and then adding a crosslinker to the mixture, where the crosslinker may be a sulfur-containing derivative, elemental sulfur and mixtures thereof. The optimum crosslinking temperature range is that where the resulting asphalt/polymer composition has a difference between the top and bottom softening points of 10° C. or less.

In another embodiment of the invention, there are provided asphalt and polymer compositions made by the process described above.

DETAILED DESCRIPTION OF THE INVENTION

Figure 1:
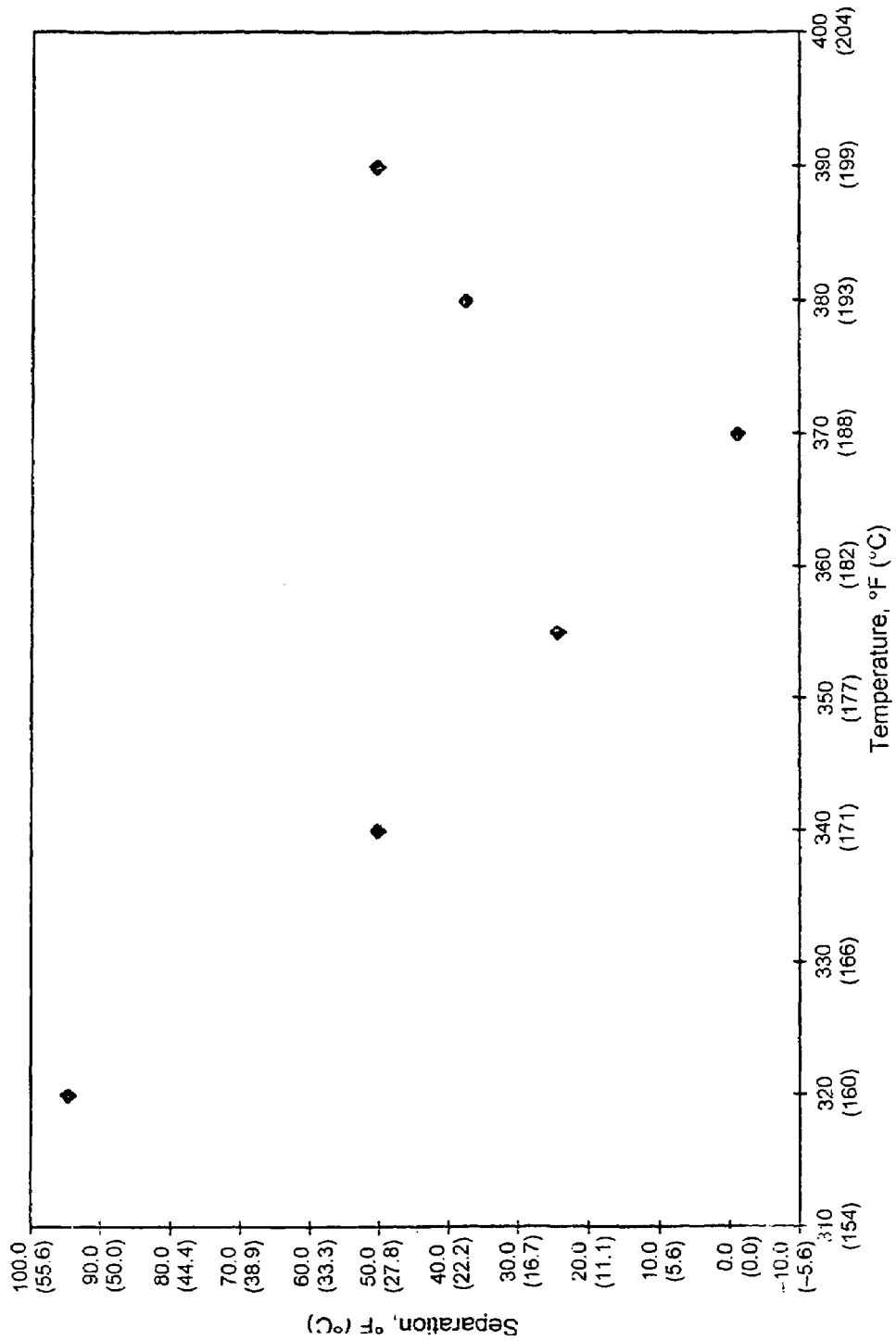
FIG. 1 is a graph of the compatibility of the asphalt/polymer compositions of this invention plotted in terms of separation as a function of crosslinking temperature.

It has been discovered that improvements in rubber/asphalt compatibility may be obtained by crosslinking with certain crosslinkers at temperatures higher than those normally employed. When particular crosslinkers are used to crosslink mixtures of asphalt and elastomeric polymers there is an optimum crosslinking temperature range at which the crosslinker is added and reacted with the mixture. This optimum crosslinking temperature range gives resulting crosslinked compositions with small differences between the top and bottom softening points. In one non-limiting embodiment, the difference between these two points is broadly 20° C. or less, in one non-limiting embodiment 10° C. or less, alternately can be 4° C. or less, and can be 2° C. or less. This invention may be considered as a potential alternative to the use of resins or other techniques to reduce separation.

Care must be taken in not subjecting the asphalt/polymer composition to elevated temperatures for too long to avoid thermal degradation of the polymer. Thus, the mixture of asphalt and elastomeric polymer can be maintained within the optimum crosslinking temperature range for a minimal period of time that is typically empirically determined. However, in one non-limiting embodiment of the invention, the mixture is kept within the optimum crosslinking temperature range for a time period ranging from about 30 to about 120 minutes, such as for example, 60 minutes.

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. Bitumens that can be used can have an initial viscosity at 140° F. (60° C.) of 600 to 3000 poise (60 to 300 Pa-s) depending on the grade of asphalt desired. The initial penetration range (ASTM D5) of the base bitumen at 77° F. (25° C.) is 20 to 320 dmm, and can be 50 to 150 dmm, when the intended use of the copolymer-bitumen composition is road paving. Bitumens that do not contain any copolymer, sulfur, etc., are sometimes referred to herein as a "base bitumen."

"Elastomeric Polymers" are natural or synthetic rubbers and include, but are not necessarily limited to, butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of a vinyl aromatic compound, e.g. styrene, and conjugated dienes. In one non-limiting embodiment of the invention, styrene/conjugated diene block copolymers may be used that are linear, radial, or multi-branched. Styrene/butadiene and styrene/isoprene copolymers having an average molecular weight of between 30,000 and 300,000 have been found to be particularly useful in the present invention.

"Conjugated dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of non-limiting example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units that are copolymers are represented by the formula:

where D is a conjugated-diene, S is styrene, and x, y and z are integers such that the number average molecular weight of the copolymer is from about 30,000 to about 300,000. These copolymers are well known to those skilled in the art and are either commercially available or can be prepared from methods known in the art. Such tri-block copolymers may be derived from styrene and a conjugated-diene, wherein the conjugated-diene is butadiene or isoprene. Such copolymers may contain 15 to 50 percent by weight copolymer units derived from styrene, alternatively may contain 20 to 35 percent derived from styrene, and then again may contain 28 to 31 percent derived from styrene, the remainder being derived from the conjugated diene. These copolymers may have a number average molecular weight range between 50,000 and 200,000, and alternatively have a number average molecular weight range between 80,000 and 180,000. The copolymer can employ a minimal amount of hydrocarbon solvent in order to facilitate handling. Examples of suitable solvents include plasticizer solvent that is a non-volatile aromatic oil. However, when the hydrocarbon solvent is a volatile solvent (as defined above), care should be taken to ensure that the amount of solvent contained in the final bitumen composition is less than about 3.5 weight percent.

The term "sulfur" is defined herein as elemental sulfur in any of its physical forms, whereas the term "sulfur-containing derivative" includes any sulfur-donating compound, but not elemental sulfur. Sulfur-donating compounds are well known in the art and include various organic compositions or compounds that generate sulfur under the mixing or preparation conditions of the present invention. In one non-limiting embodiment, the elemental sulfur is in powder form known as flowers of sulfur. Other sulfur-containing derivatives or species that can be used in the invention include, but are not necessarily limited to mercaptobenzothiazole, thiurams, and the like, and combinations thereof. In another non-limiting embodiment of the invention, the sulfur is present in an amount ranging from about 0.06% to about 0.3 wt. % based on the asphalt, abd alternatively is present in an amount from about 0.08 to about 0.2 wt. %.

Acceptable crosslinkers, in one non-limiting embodiment of the invention, are thiuram polysulfides. In another non-limiting embodiment of the invention, the thiuram polysulfides have the formula:

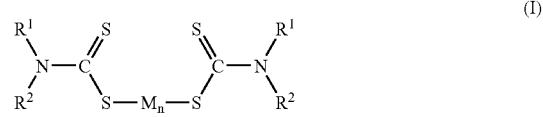

where $R^1$ and $R^2$ are the same or different alkyl substituents having from 1 to 4 carbon atoms, and wherein M is a metal selected from zinc, barium or copper, and n is 0 or 1. In another non-limiting embodiment of the invention, a crosslinking temperature range for thiuram polysulfides of formula (I) is above 180° C. (356° F.), alternatively, the crosslinking temperature range may be between about 185 and about 190° C. (365-374° F.). In one non-limiting embodiment of the invention, the optimal crosslinking temperature range for a particular crosslinker is determined empirically. In another non-limiting embodiment of the invention, the optimal crosslinking temperature range is 20° C. wide, in one non-limiting embodiment of the invention 10° C. wide, in another non-limiting embodiment 4° C. wide, and in yet another non-limiting embodiment of the invention 5° C. wide or less.

In still another non-limiting embodiment of the invention, the sulfur-containing derivative excludes added elemental sulfur, per se. Alternatively, the asphalt and elastomeric polymer mixture may contain added elemental sulfur, but the crosslinking is conducted at a temperature different from the optimum crosslinking temperature for elemental sulfur, per se.

The term "desired Rheological Properties" refers primarily to the SUPERPAVE asphalt binder specification designated by AASHTO as SP-1. Additional asphalt specifications can include viscosity at 140° F. (60° C.) of from 1600 to 4000 poise (160-400 Pa-s) before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging.

Viscosity measurements are made by using ASTM test method D2171. Ductility measurements are made by using ASTM test method D113. Toughness and tenacity measurements are made by a Benson Method of Toughness and Tenacity, run at 20 inches/minute (50.8 cm/minute) pull rate with a ⅛ inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325±0.5° F. (163±2.8° C.) for seven days. In one non-limiting embodiment of the invention, the viscosity does not increase by a factor of two or more during storage at 325° F. (163° C.) for seven days. In another non-limiting embodiment of the invention, the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially solid or semi-solid materials at room temperature that gradually liquify when heated. Its predominant constituents are bitumens, which may be naturally occurring or obtained as the residue of refining processing. The asphalt terms used herein are well known to those skilled in the art. For an explanation of these terms, reference is made to the booklet SUPERPAVE Series No. 1 (SP-1), 1997 printing, published by the Asphalt Institute (Research Park Drive, P.O. Box 14052, Lexington, Ky. 40512-4052), which is hereby incorporated by reference in its entirety. For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. This is used to predict permanent deformation or rutting and fatigue cracking. Bending Beam Rheometers (BBRs) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet. For example, pages 62-65 of the booklet include a table entitled Performance Graded Asphalt Binder Specifications. The asphalt compositions are given performance grades, for example, PG 64-22. The first number, 64, represents the average 7-day maximum pavement design temperature in ° C. The second number, −22, represents the minimum pavement design temperature in ° C. Other requirements of each grade are shown in the table. For example, the maximum value for the PAV-DSR test (° C.) for PG 64-22 is 25° C.

In accordance with one non-limiting embodiment of the present invention, an asphalt composition is prepared by adding the asphalt or bitumen to a mixing tank that has stirring means. The asphalt is added and stirred at elevated temperatures. Stirring temperatures depend on the viscosity of the asphalt and can range up to 500° F. (260° C.). Asphalt products from refinery operations are well known in the art. For example, asphalts typically used for this process are obtained from deep vacuum distillation of crude oil to obtain a bottom product of the desired viscosity or from a solvent deasphalting process that yields a demetallized oil, a resin fraction and an asphaltene fraction. Some refinery units do not have a resin fraction. These materials or other compatible oils of greater than 450° F. (232° C.) flash point may be blended to obtain the desired viscosity asphalt.

Rubbers, elastomeric polymers, or thermoplastic elastomers suitable for this application are well known in the art as described above. For example, FINAPRENE® products available from Atofina Petrochemicals Inc. are suitable for the applications of the present invention. This example is not limiting for the inventive technology that can be applied to any similar elastomeric product particularly those produced from styrene and butadiene.

Various additives suitable for the purposes of this invention include, but are not necessarily limited to, known and future accelerators, activators, and the like. A variety of accelerators may be used in conjunction with this invention, including, but not limited to, dithiocarbamates and benzothiazoles.

The methods and compositions of this invention will be further illustrated with respect to particular Examples that are only intended to more fully illuminate the invention and not limit it.

EXAMPLES 1-13

The base asphalt used was a PG 64-22. It was made by blending an asphaltenes sample designated 97-116 with a flux oil designated 97-134. The Triflux 250 flux oil was produced from Boscan crude.

This blend initially showed severe incompatibility with F 411 SBS rubber. The top and bottom softening points of aged samples differed by as much as 100° F. (56° C.).

The asphaltene/flux oil blend was preheated and held at the specified mixing temperature for 30 minutes with an oil bath. The mixing temperature was that of the asphalt as measured with a hand-held thermocouple. The rubber was added and mixed with a Silverson high shear lab mixer until a smooth homogeneous mixture was obtained (approximately 30-45 minutes).

The high shear mixer was replaced with a low shear prop mixer. The temperature of oil bath was then adjusted to bring the asphalt/rubber mixture to the proper crosslinking temperature and allowed to stabilize. The crosslinking additives were slowly added. Low shear mixing was continued for 90 minutes. The samples were then placed in a 325° F. (163° C.) oven overnight. On removal, the samples were stirred for a few minutes with a low shear mixer to insure homogeneity. The samples were then poured for separation and other testing.

The results are shown in Table I and a plot of separation versus crosslinking temperature is graphed in FIG. 1. It may be seen that a dramatic improvement in separation was obtained at an optimal crosslinking temperature of about 370° F. (188° C.).

TABLE I

Evaluation of Crosslinking Temperature in Asphalt Crosslinking Systems

| Ingredients | | Ex.: 1 | 2 | 3 | 4 | 5 | 6 |
|---|---|---|---|---|---|---|---|
| Flux Oil (97-134) | Wt % | 80 | 80 | 80 | 80 | 80 | 80 |
| Asphaltenes (97-116) | Wt % | 20 | 20 | 20 | 20 | 20 | 20 |
| F 401 | Wt % | 4 | | | | | 2.67 |
| F 502 | Wt % | | 4 | | | | 1.33 |
| F 411 | Wt % | | | 4 | | | |
| Kraton 1101 | Wt % | | | | 4 | | |
| Kraton 1116 | Wt % | | | | | 4 | |
| Sulfur | Wt % | 0.05 | 0.05 | 0.05 | 0.05 | 0.05 | 0.05 |
| Methyl Zimate | Wt % | 0.05 | 0.05 | 0.05 | 0.05 | 0.05 | 0.05 |
| Mixing temperature | ° F. (° C.) | 350 (177) | 350 (177) | 350 (177) | 350 (177) | 350 (177) | 350 (177) |
| Crosslinking temperature | ° F. (° C.) | 320 (160) | 320 (160) | 320 (160) | 320 (160) | 320 (160) | 320 (160) |
| Compatibility | | 24 hrs - 325° F. (163° C.) | | | | | |
| Top | ° F. (° C.) | 163.7 (73.2) | 162.2 (72.3) | 236.2 (113.4) | 174.7 (79.3) | 171.3 (77.4) | 171.0 (77.2) |
| Bottom | ° F. (° C.) | 142.2 (61.2) | 149.7 (65.3) | 141.5 (60.8) | 140.5 (60.3) | 140.8 (60.4) | 138.4 (59.1) |
| Delta (separation) | ° F. (° C.) | 21.5 (12.0) | 12.5 (7.0) | 94.7 (52.6) | 34.2 (19.0) | 30.5 (17.0) | 32.6 (18.1) |

| Ingredients | | Ex.: 7 | 8 | 9 | 10 | 11 | 12 |
|---|---|---|---|---|---|---|---|
| Flux Oil (97-134) | Wt % | 80 | 80 | 80 | 80 | 80 | 80 |
| Asphaltenes (97-116) | Wt % | 20 | 20 | 20 | 20 | 20 | 20 |
| F 401 | Wt % | 1.33 | | | | | |
| F 502 | Wt % | 2.67 | | | | | |
| F 411 | Wt % | | 3 | 3 | 3 | 3 | 3 |
| Kraton 1101 | Wt % | | | | | | |
| Kraton 1116 | Wt % | | | | | | |
| Sulfur | Wt % | 0.05 | 0.05 | 0.05 | 0.05 | 0.05 | 0.05 |
| Methyl Zimate | Wt % | 0.05 | 0.05 | 0.05 | 0.05 | 0.05 | 0.05 |
| Mixing temperature | ° F. (° C.) | 350 (177) | 370 (188) | 370 (188) | 370 (188) | 370 (188) | 370 (188) |
| Crosslinking temperature | ° F. (° C.) | 320 (160) | 370 (188) | 340 (171) | 355 (179) | 390 (199) | 380 (193) |
| Compatibility | | 24 hrs - 325° F. (163° C.) | | | | | |
| Top | ° F. (° C.) | 169.0 (76.1) | 139.8 (59.9) | 190.5 (88.1) | 165.0 (73.9) | 189.1 (87.3) | 175.3 (79.6) |
| Bottom | ° F. (° C.) | 144.0 (62.2) | 140.8 (60.4) | 140.1 (60.1) | 140.5 (60.3) | 138.5 (59.1) | 137.7 (58.7) |
| Delta (separation) | ° F. (° C.) | 25.0 (13.9) | −1.0 (−0.5) | 50.4 (28.0) | 24.5 (13.6) | 50.6 (28.2) | 37.6 (20.9) |

F 401 is a Finaprene SBS Rubber available from Atofina Petrochemical.
F 502 is a Finaprene SBS Rubber available from Atofina Petrochemical.
F 411 is a Finaprene SBS Rubberavailable from Atofina Petrochemical.
Kraton 1101 is a SBS Rubber available from Kraton Polymers.
Kraton 1116 is a SBS Rubberavailable from Kraton Polymers
Methyl Zimate ® is a trademarked name for zinc dimethyldithiocarbamate available from R. T. Vanderbilt, Inc. and is a thiuram polysulfide within the scope of this invention.

One potential explanation of the phenomenon illustrated in FIG. 1 is that as the crosslinking temperature is increased, the reaction becomes less selective with interspecies links formed between the rubber and the asphaltenes. At still higher temperatures, more crosslinking between asphaltene molecules occurs which again makes them incompatible with rubber. However, the inventor does not want the invention to be limited by any particular theory, explanation or supposed mechanism.

Figure 2:
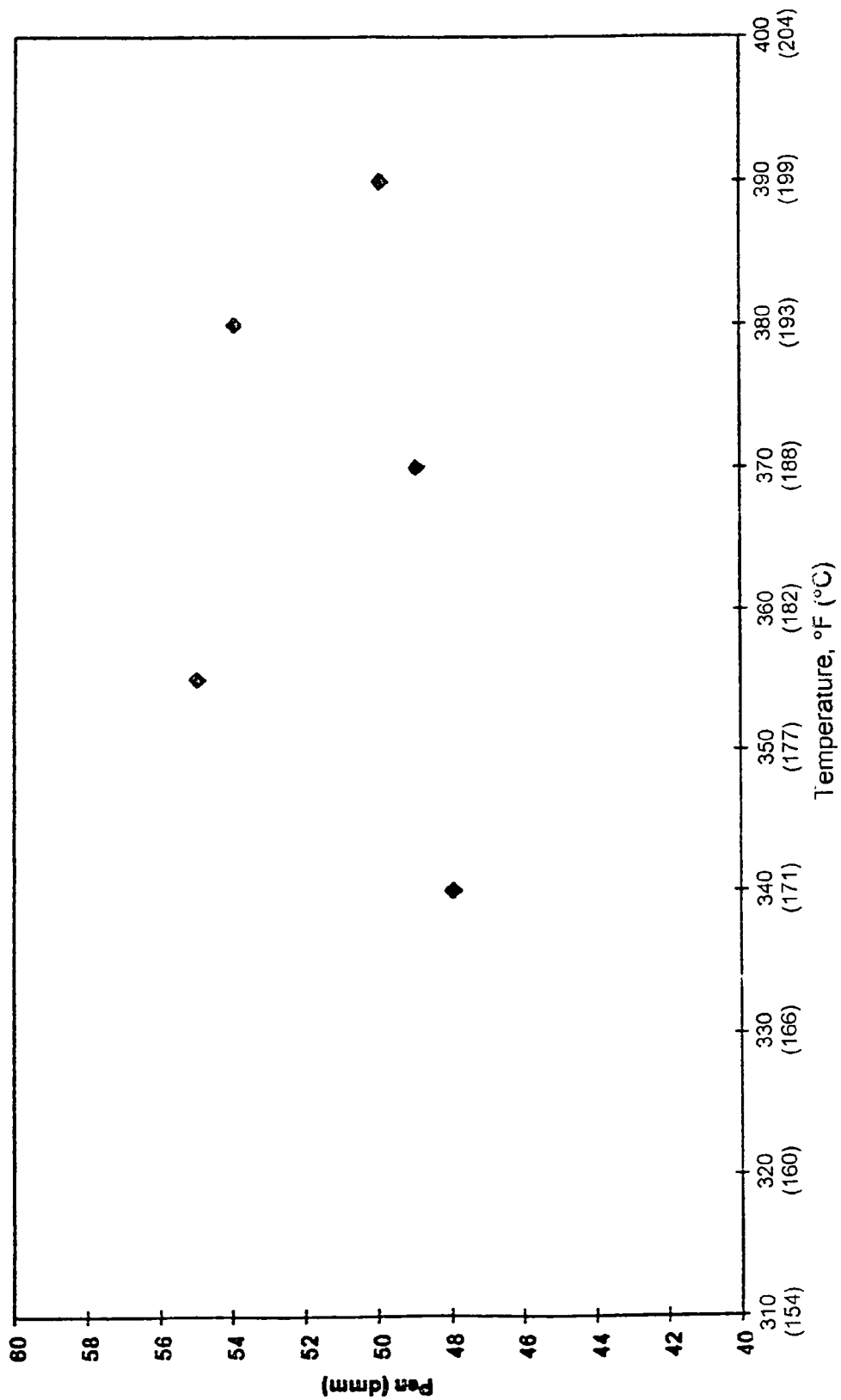
FIG. 2 is a graph illustrating the relationship between penetration and the crosslinking temperature.
Figure 3:
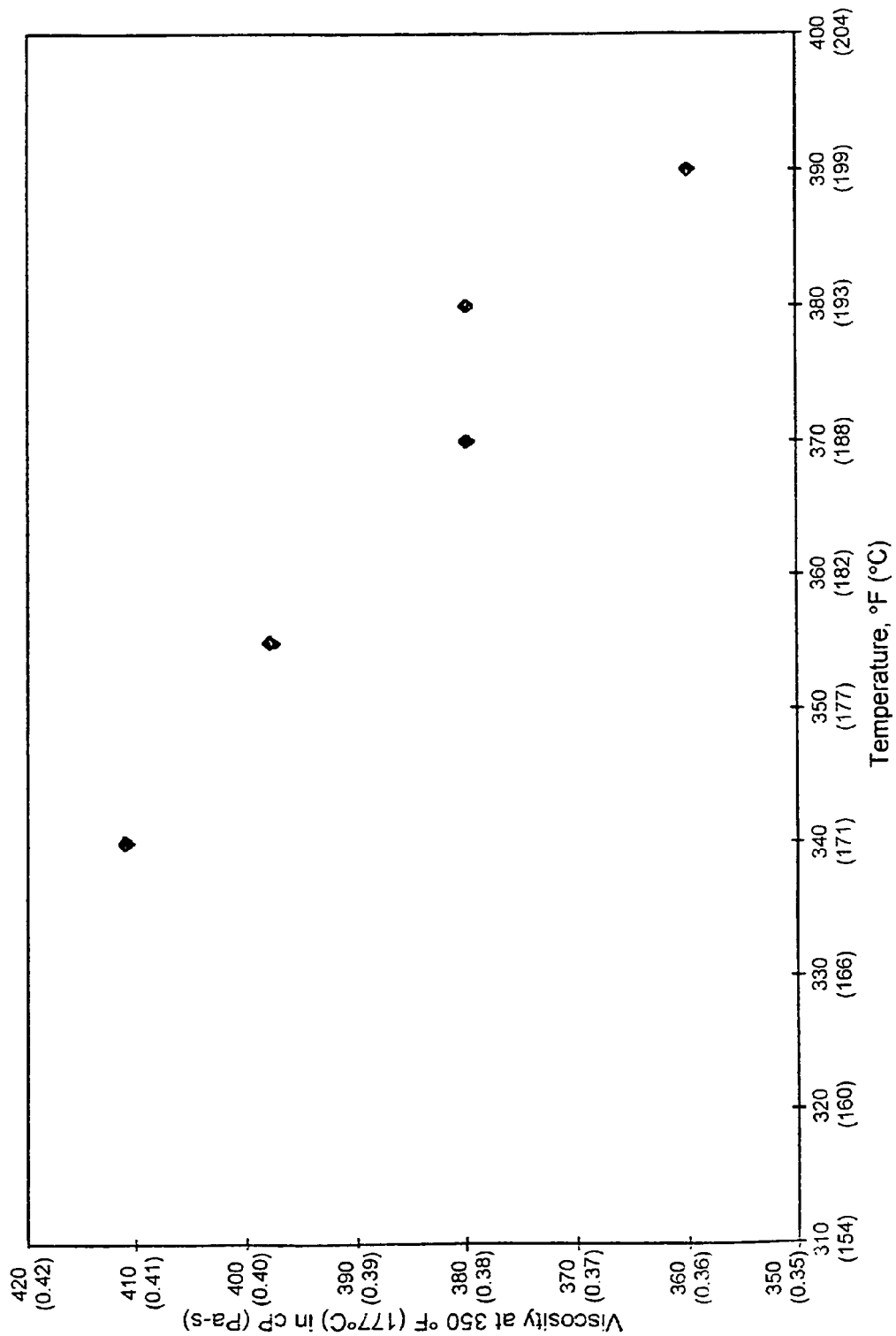
FIG. 3 is a graph plotting Brookfield viscosity as a function of crosslinking temperature.

Two other properties of the crosslinked asphalt were measured as a part of the study: penetration and viscosity at 350° F. (177° C.). As shown in FIG. 2, there was no significant trend in penetration at different crosslinking temperatures. The viscosity decreased as the crosslinking temperature increased as shown in FIG. 3, most likely due to the improved compatibility.

One concern of raising the crosslinking temperature to 370° F. (188° C.) is the increased risk of excessive thermal crosslinking occurring that may cause the asphalt to be unusable (high viscosity gel). Thus, a balance needs to be achieved in choosing a crosslinking temperature between obtaining good separation and minimizing thermal crosslinking.

The data for Examples 14 through 18 presented in Table II below demonstrates that crosslinking may be achieved at elevated temperatures (380° F.; 193° C.) using the method of this invention without causing the asphalt/polymer composition to gel, as shown for Examples 16 and 18.

TABLE II

Evaluation of Crosslinking Temperature in Asphalt Crosslinking Systems

| Component | Units | Example 13 | 14 | 15 | 16 | 17 |
|---|---|---|---|---|---|---|
| SBS Finaprene 411 | Wt % | 2 | 2 | 2 | | |
| SBS Kraton 1184 | Wt % | | | | 2 | 2 |
| Sulfur | Wt % | 0.03 | 0.03 | 0.03 | 0.03 | 0.03 |
| Zinc oxide | Wt % | 0.02 | 0.02 | 0.02 | 0.02 | 0.02 |
| MBT | Wt % | 0.02 | 0.02 | 0.02 | 0.02 | 0.02 |
| Mixing Temperature | ° F. (° C.) | 325 (163) | 360 (182) | 380 (193) | 360 (182) | 380 (193) |
| Blend result | | gelled | gelled | no gel | gelled | no gel |

Kraton 1184 is an SBS rubber available from Kraton Polymers.

In the foregoing specification, the invention has been described with reference to specific embodiments thereof, and has been demonstrated as effective in providing methods for preparing asphalt and polymer compositions with optimized separation between the top and bottom softening points. However, it will be evident that various modifications and changes can be made to the method without departing from the broader spirit or scope of the invention as set forth in the appended claims. Accordingly, the specification is to be regarded in an illustrative rather than a restrictive sense. For example, specific combinations or amounts of asphalt, polymer, crosslinker, activator, accelerator, and other components falling within the claimed parameters, but not specifically identified or tried in a particular PMA system, are anticipated and expected to be within the scope of this invention. Specifically, the method and discovery of the invention are expected to work with crosslinkers other than those exemplified herein.

I claim:

1. A method for preparing polymer modified asphalt compositions comprising:
   mixing asphalt and an elastomeric polymer to form a mixture;
   adding a crosslinker to the mixture at a crosslinking temperature of above 180° C. and within a temperature range of 20° C. wide to form the polymer modified asphalt composition, wherein the crosslinker is selected from the group consisting of a sulfur-containing derivative, elemental sulfur and mixtures thereof;
   wherein the sulfur-containing derivative is a thiuram polysulfide having a formula of:

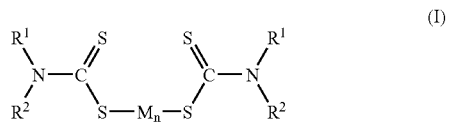

(I)

where $R^1$ and $R^2$ are the same or different alkyl substituents having from 1 to 4 carbon atoms, M is a metal selected from zinc, barium or copper and n is 0 or 1; and
   determining a top and bottom softening point of the polymer modified asphalt composition, wherein the crosslinking temperature is adapted to control the compatibility of the polymer modified asphalt composition, resulting in a difference between the top and bottom softening points of 20° C. or less, using a ring and ball softening point test.

2. The method of claim 1, wherein the difference between the top and bottom softening points is 10° C. or less.

3. The method of claim 1, wherein the difference between the top and bottom softening points is 4° C. or less.

4. The method of claim 1, wherein the difference between the top and bottom softening points is 2° C. or less.

5. The method of claim 1, wherein the elastomeric polymer is a vinyl aromatic/conjugated diene elastomer.

6. The method of claim 1, wherein the elastomeric polymer is a styrene-butadiene copolymer.

7. The method of claim 1, wherein the crosslinker further includes elemental sulfur, mercaptobenzothiazole (MBT), and mixtures thereof.

8. The method of claim 1, wherein the elastomeric polymer comprises from about 1 to 20 wt.% of the polymer modified asphalt composition and wherein the polymer modified asphalt composition has a penetration of between about 20 and 320 dmm.

9. The method of claim 1, wherein the crosslinker is present in an amount of from about 0.01 wt.% to about 0.1 wt.% based on the weight of the polymer modified asphalt composition.

10. A method for forming polymer modified asphalts comprising:
    mixing asphalt and an elastomeric polymer to form a first mixture;
    determining a crosslinking temperature range capable of forming a polymer modified asphalt having a difference between a top and bottom softening points of 4° C. or less for a cross-linking agent to be incorporated into the first mixture;
    heating the first mixture to a crosslinking temperature above 180° C. and within a temperature range of 20° C.;

adding the cross-linking agent to the first mixture to form a second mixture, wherein the cross-linking agent comprises a thiuram polysulfide having the formula:

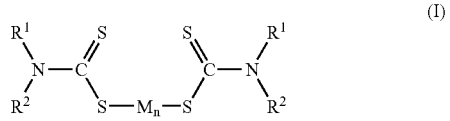

where $R^1$ and $R^2$ are the same or different alkyl substituents having from 1 to 4 carbon atoms, M is a metal selected from zinc, barium or copper and n is 0 or 1;

mixing the second mixture for a time of from 30 minutes to 120 minutes;

reducing the temperature of the second mixture; and storing the second mixture, wherein the second mixture comprises a polymer modified asphalt having a storage stable viscosity.

11. The method of claim 10, wherein the cross-linking agent is further includes elemental sulfur, mercaptobenzothiazole (MBT), and mixtures thereof.

* * * * *